Oct. 22, 1957     J. N. DAWSON     2,810,230
EXPANDING FISH HOOK
Filed July 1, 1955
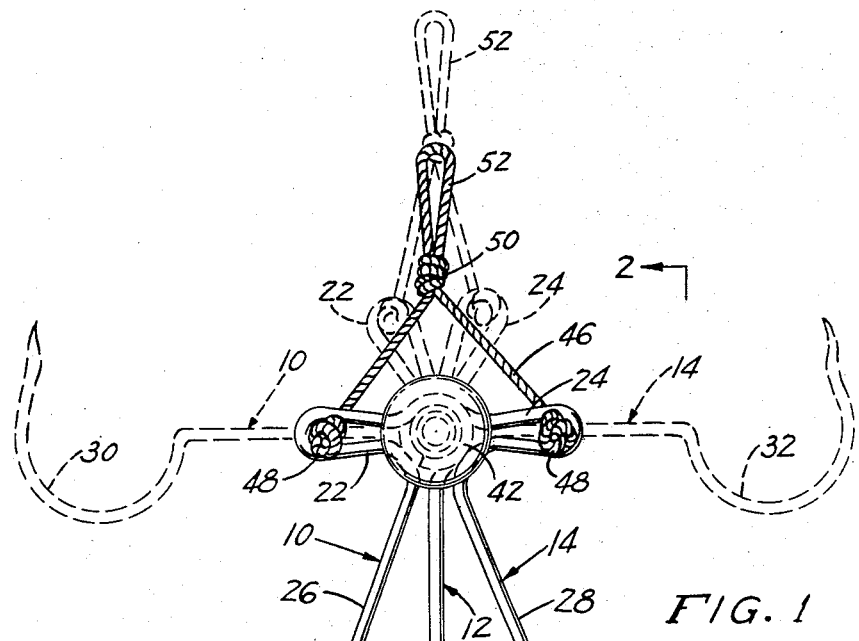
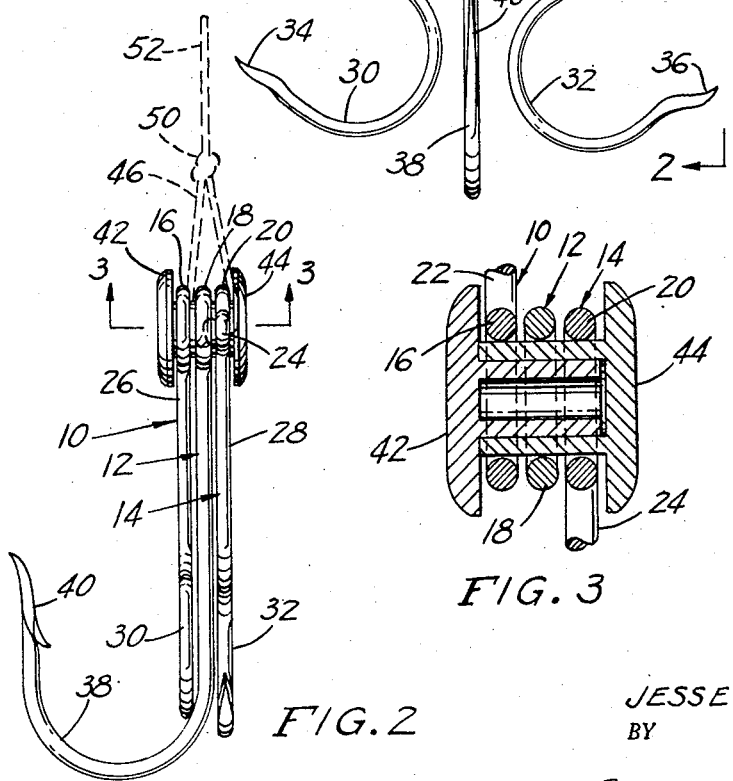
INVENTOR.
JESSE N. DAWSON

United States Patent Office 2,810,230
Patented Oct. 22, 1957

2,810,230

EXPANDING FISH HOOK

Jesse N. Dawson, Bellefonte, Ark.

Application July 1, 1955, Serial No. 519,416

3 Claims. (Cl. 43—37)

This invention relates to fish hooks, and more particularly has reference to a fish hook of the treble type, the invention being directed to means normally holding the several hook portions in closely spaced relation, but adapted to cause said hook portions to shift outwardly from one another to set the same firmly in the fish's mouth, responsive to pull exerted on the fishing line when the treble hook has been taken with the bait by a fish.

The main object of the present invention is to provide a generally improved fish hook, which will be so designed as to permit the several hook members to be disposed in closely spaced relation, for concealment thereof within a bait or at least for disposition thereof in a small enough area to permit the complete hook assembly to be taken into the mouth of a fish, the hook members being so interconnected with one another and with a fishing line as to cause two of the members to swing outwardly from the third member to become firmly set in opposite sides of the fish's mouth.

Another object of importance is to provide a hook as stated which will be characterized by ease of assembly or disassembly so far as the component parts thereof are concerned, the device in this regard being formed with cooperating male and female screw connected elements receiving the several eyes of the hook members, so that said members can be all pivotally connected to the screw members for relative swinging movement, with ease and facility to accomplish assembly of the hook.

Another object of importance is to provide a hook device as stated in which the outward swinging action of the side hook members will be effected instantaneously, responsive to exertion of even a slight pull upon the line by the fish, thus to insure that the fish will be firmly hooked when it takes the bait.

Yet another object is to provide a hook as stated which can be manufactured at low cost, will have interchangeable components, thus to permit replacement of any component when it becomes bent or otherwise damaged without requiremnet of discarding the entire device, and will be capable of manufacture at low cost while still being designed for long usage and trouble free operation.

Other objects will appear from the following description, the claims appended thereto, and from the annexed drawing in which like reference characters designate like parts throughout the several views and wherein:

Figure 1 is a front elevational view of a treble fish hook formed according to the present invention, the dotted lines showing the movable components of the hook when they are swung outwardly to become set in a fish's mouth responsive to the exertion of pull on the fish line, and the full lines showing the hook in its retracted condition;

Figure 2 is a side elevational view of the device as seen from the line 2—2 of Figure 1; and Figure 3 is an enlarged transverse sectional view on line 3—3 of Figure 2.

The illustrated hook assembly of the present invention includes two opposed spreadable hooks 10 and 14, and a third relatively stationary hook 12, the hooks 10 and 14 being swingable between the full and the dotted line positions of Figure 1, while the stationary hook 12 remains in a vertical depending position, both before and after the hooking of a fish.

Formed upon the upper ends of the hooks are eyes 16, 18, 20 respectively, said eyes being coaxially aligned as shown in Figure 3. The eyes of the opposed hooks 10, 14, are integral with oppositely, laterally outwardly projecting, elongated loops 22, 24, respectively, which are extensions of the straight shanks 26, 28 of the opposed hooks. The shanks in turn, at their lower ends, merge into crooks 30, 32 and, as shown in Figure 1, the crooks of the respective side hooks are bowed laterally inwardly toward one another, with each hook portion extending through a circular path over approximately 180 degrees, the diameter of said path being an extension of the lengths of the shanks 26, 28. At their outer ends, the hook portions 30, 32 are integrally formed with undulant, sharply tipped points 34, 36 projecting outwardly in opposite directions. These are not barbed, for a purpose to be made presently apparent.

The center hook 12 is disposed in a position in which its eye 18 is between the eyes 16, 20 of the side hooks, as shown in Figures 2 and 3, and the eye of the center hook merges directly into the straight, elongated shank of the center hook, which is formed at its lower end with an arcuately curved hook portion 38 terminating in a barb 40. The center hook shank and hook portion lie in a plane perpendicularly related to the planes of the side hooks, the side hooks swinging in their own planes between the full and dotted line positions shown in Figure 1. The side hook 26, in this connection, is slightly shorter in length than the side hook 28, the purpose of this arrangement being to provide clearance for the side hook 10 permitting it to swing fully to its lower position, clear of the hook portion 38 of the center hook, as shown in Figure 2.

The several hooks are connected by means of a headed male screw member 42 extending through the eyes 16, 18, 20, and threadedly engaged in a female, headed screw member 44, the heads of the screw members being disposed adjacent the outer surfaces of the eyes 16, 20 respectively. The side hooks are freely swingable upon the connecting pin defined by the screw members 42, 44.

A flexible connector element 46, formed from a short length of fish line or the like, or alternatively formed from a short length of a leader, is provided with knots 48 at its opposite ends, the knotted ends of the flexible element being engaged in the loop shaped extensions 22, 24. The respective end portions of the flexible elements converge in a direction away from the connecting pin, and in spaced relation to said pin, the end portions of the flexible element are knotted together at 50, to form, intermediate the opposite ends of the flexible element, a loop 52 to which a fishing line or leader, not shown, can be attached.

In use, the several hooks are brought together and can be swung inwardly beyond the full line position shown in Figure 1, to an extent that will dispose the shanks of all three hooks in parallel relation. This will confine the hook portions 30, 32, 38, in a minimum area, and a bait can be attached to the center hook, in such a position that when a fish takes the bait, it will swallow the treble hook. The fish, having taken the bait, exerts a pull downwardly in Figure 1 or in Figure 2, and this pull will be transmitted to the connecting pin defined by the screw members 42, 44. As a result, the pull is resisted by the fishing line and the flexible element, and is translated into an upward pull upon the loop 52, that is, a pull upon the loop 52 in a direction away from the connecting pin. Therefore, the extensions 22, 24 are swung from their full line to their dotted line positions in Figure 1, and this of course has the effect of swinging the side hooks outwardly from the center hook, to the dotted line positions thereof shown in Figure 1. Since the hook has been taken into the mouth of the fish, the sharply pointed tips 34, 36 will be embedded in opposite sides of the fish's mouth, thus firmly setting the hook assembly and preventing escape by the fish.

When the fish is to be removed, the line is left slack, so as to permit the side hooks to swing downwardly to their lower or inner positions, and it will be observed that this is accomplished with ease, due to the fact that hook portions 30, 32 are not barbed. Then, the barb of the center hook is disengaged from the fish's mouth in the regular manner and the hook assembly is removed.

It is believed apparent that this invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a fish hook assembly, a pair of spreadable and opposed hooks and a relatively stationary hook, each of said hooks having a straight shank portion and a lower end portion formed with a crook and an outward projection, the crook of each of the opposed hooks being outwardly facing and curvedly displaced laterally inwardly of their shank in planes parallel to each other and the crook of the stationary hook being disposed in a plane at right angles to the crooks of the opposed hooks, the upper end of the shank of the stationary hook being formed to provide an eye, each of said opposed hooks being formed to provide a laterally outwardly extending loop on the upper end of the shank portion, said loops projecting in opposite directions, each of said loops having an outer end and an inner end, the inner end of each of the loops being formed to provide an eye, the eye of the stationary hook being interposed between and axially aligned with the eye of each of the opposed hooks, headed pivot means extending through each of said eyes and assembling the opposed hooks and the stationary hook together, and a flexible connector having laterally spaced depending portions connected to the outer ends of the loops of the opposed hooks.

2. In a fish hook assembly, a pair of spreadable and opposed hooks and a relatively stationary hook, each of said hooks having a straight shank portion and a lower end portion formed with a crook and an outward projection, the crook of each of the opposed hooks being outwardly facing and curvedly displaced laterally inwardly of their shank in planes parallel to each other and the crook of the stationary hook being disposed in a plane at right angles to the crooks of the opposed hooks, the upper end of the shank of the stationary hook being formed to provide an eye, each of said opposed hooks being formed to provide a laterally outwardly extending loop on the upper end of the shank portion, said loops projecting in opposite directions, each of said loops having an outer end and an inner end, the inner end of each of the loops being formed to provide an eye, the eye of the stationary hook being interposed between and axially aligned with the eye of each of the opposed hooks, headed pivot means extending through each of said eyes and assembling the opposed hooks and the stationary hook together, and a flexible connector having laterally spaced depending portions connected to the outer ends of the loops of the opposed hooks, the crook of the stationary hook extending laterally outwardly from the shank of the stationary hook and beneath and laterally outwardly of the crook of one of the opposed hooks.

3. In a fish hook assembly, a pair of spreadable and opposed hooks and a relatively stationary hook, each of said hooks having a straight shank portion and a lower end portion formed with a crook and an outward projection, the crook of each of the opposed hooks being outwardly facing and curvedly displaced laterally inwardly of their shank in planes parallel to each other and the crook of the stationary hook being disposed in a plane at right angles to the crooks of the opposed hooks, the upper end of the shank of the stationary hook being formed to provide an eye, each of said opposed hooks being formed to provide a laterally outwardly extending loop on the upper end of the shank portion, said loops projecting in opposite directions, each of said loops having an outer end and an inner end, the inner end of each of the loops being formed to provide an eye, the eye of the stationary hook being interposed between and axially aligned with the eye of each of the opposed hooks, headed pivot means extending through each of said eyes and assembling the opposed hooks and the stationary hook together, and a flexible connector having laterally spaced depending portions connected to the outer ends of the loops of the opposed hooks, the crook of the stationary hook extending laterally outwardly from the shank of the stationary hook and beneath and laterally outwardly of the crook of one of the opposed hooks, the shank of said one opposed hook being shorter than the shank of the other opposed hook.

References Cited in the file of this patent

UNITED STATES PATENTS

| | | |
|---|---|---|
| 484,678 | Shults | Oct. 18, 1892 |
| 807,514 | Stockwell | Dec. 19, 1905 |
| 1,340,780 | Leon | May 18, 1920 |
| 1,974,358 | Glau | Sept. 18, 1934 |
| 2,244,980 | Abramson | June 10, 1941 |
| 2,543,501 | Kleppen et al. | Feb. 27, 1951 |